United States Patent [19]

Esdaile et al.

[11] 4,138,247
[45] Feb. 6, 1979

[54] METHOD FOR PROMOTING SOLIDS-LIQUID FLOW

[75] Inventors: James D. Esdaile, Glen Waverley; Alan B. Whitehead, Brighton; Graeme W. Walters, Mt. Waverley; William T. Denholm, Camberwell, all of Australia

[73] Assignee: Commonwealth Scientific and Industrial Research Organization, Campbell, Australia

[21] Appl. No.: 815,003

[22] Filed: Jul. 12, 1977

[30] Foreign Application Priority Data

Jul. 19, 1976 [AU] Australia ............................. 6693/76

[51] Int. Cl.² ............................................. C22B 13/06
[52] U.S. Cl. ............................................. 75/79; 75/63; 75/68 R; 75/85; 75/86
[58] Field of Search ...................... 75/79, 85, 63, 65 R, 75/68 R, 86

[56] References Cited

U.S. PATENT DOCUMENTS

| 1,001,525 | 8/1911 | Hulst | 75/79 |
| 3,094,411 | 6/1963 | Triffleman | 75/65 R |

Primary Examiner—M. J. Andrews
Attorney, Agent, or Firm—Cushman, Darby & Cushman

[57] ABSTRACT

A process for the reflux refining of metals in which impure metal crystals within a column of the liquid metal are transported from a cool zone through a temperature gradient to a hot zone, wherein melting of the crystals occurs; said transport being facilitated by the use of a mechanical device comprising a plurality of elements movably supported at spaced-apart locations within the column, each element being of small maximum transverse cross-sectional area relative to that of the column, said elements being moved at least reciprocally in the direction of extent of the column, whereby in consequence of the shape and movement of the elements there is, in the vicinity of each element, a nett displacement of crystals towards the hot zone.

22 Claims, 8 Drawing Figures

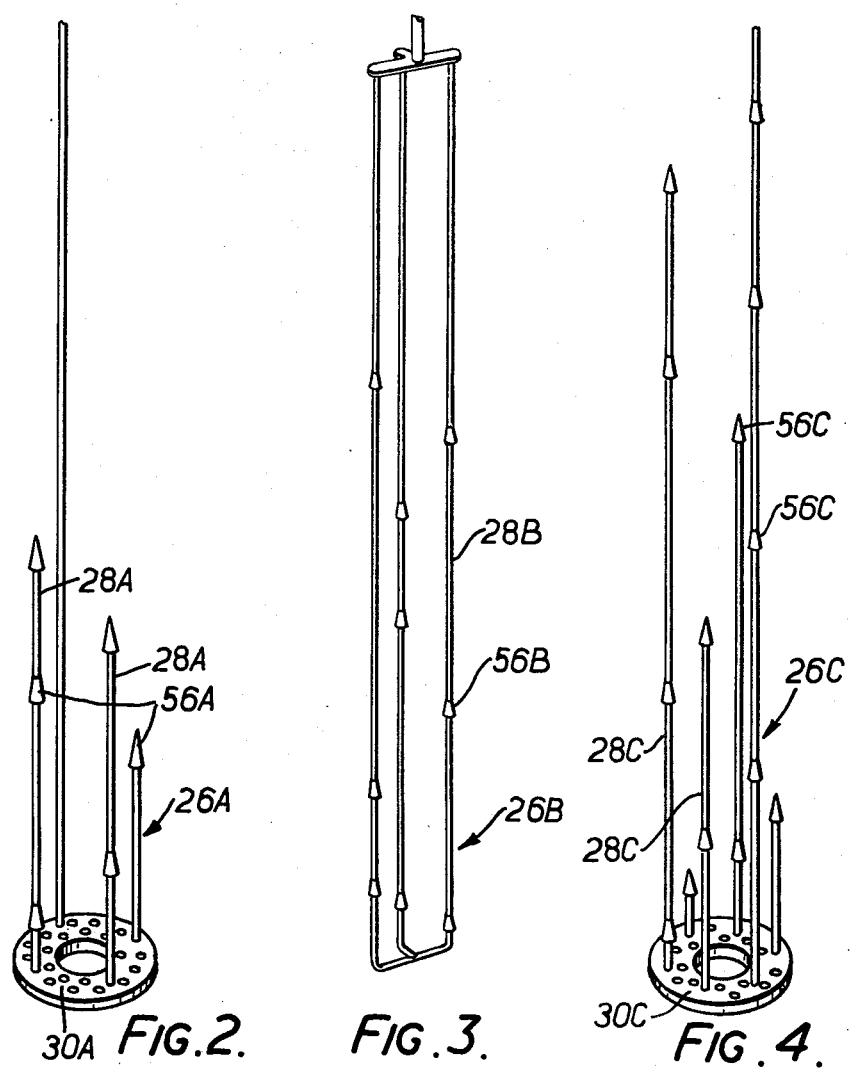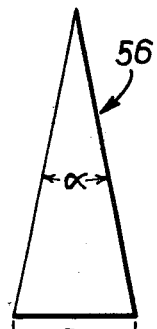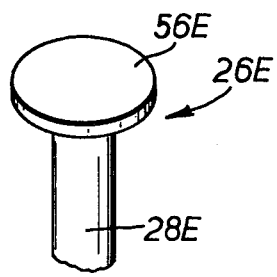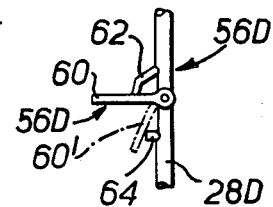

METHOD FOR PROMOTING SOLIDS-LIQUID FLOW

BACKGROUND OF THE INVENTION

1. Field of the Invention

This invention relates to a method and apparatus for promoting flow of finely divided solids material which flow is at least over one or more transitory time intervals a "plug" flow. By the term "plug flow" in this specification is meant flow of a finely divided solids material in counter-current flow to a liquid in which the flows of liquid and solids material are maintained such as to each occupy substantially homogeneously the cross-section of flow and such as to be at a separate substantially constant flow speed at all points at such cross-section.

2. Prior Art

The establishment of "plug" flow is essential or desirable in certain manufacturing processes particularly in processes for refining of metals or other crystalline substances. Thus, for example, U.S. Pat. Nos. 2,540,997, Re 24,038 and 2,540,083 describe purification of low-melting organic substances wherein a slurry of the crystalline substance produced by preliminary chilling of the liquid substance is fed into the top or central portion of a column which is heated at the base and has provision for removal of purified liquid substance from the base of the column and for recycling the impurity enriched liquid from the top of the column. Again, U.S. Pat. No. 4,043,803 there is described a process for continuous refining of metals which process comprises forming a liquid column of the metal, said column having a relatively cool zone and a relatively hot zone and a continuous temperature gradient between said zones; the temperature of the cool zone being such as to permit coexistence of liquid and crystalline metal and said hot zone being at a temperature sufficient to melt the crystals; partially melting a solid massive body of the metal to form a slurry of the crystalline metal in the liquid metal, feeding said slurry into the cool zone of said column; transporting the crystals through the temperature gradient and into the hot zone, wherein melting of the crystals occurs and the hot zone thereby becomes enriched with the pure liquid metal and continuously withdrawing a portion of the liquid metal from the hot zone.

With both of these processes, if good results are to be obtained in terms of throughput, the flow of crystals within the column must be, over at least a transitory time period, plug flow in counter flow to the flow of liquid metal. The efficiency of the processes is related to the rate of flow of the crystals and at least for appreciable production rates there must be a substantial rate of flow. On the other hand, the greater the flow rate the more difficult it becomes to properly maintain the desired form of flow, there being a tendency for the liquid material to develop channel flow at particular locations through the advancing crystals or other material.

The prior art discloses various means for facilitating achievement of the desired flow characteristics. For example, it is known to "pulse" the column by pulsing of liquid at the foot of the material in the column to cause periodic movement thereof. McKay, Dale & Weidman have described (Industrial & Engineering Chemistry volume 52 No. 3 at Page 157) an arrangement in which an inverted cup-shaped piston covered at its lower end with a mesh screen is positioned within the column material and reciprocated. Australian Pat. No. 416,845 discloses arrangements in which a stirrer is positioned within the column and rotated. The stirrer is in the form of an elongate shaft having a plurality of sidewardly extending projections. Whilst these arrangements are to some extent satisfactory, they do not produce as great an improvement in efficiency in some operations as may be possible and it is an object of this invention to provide improved means for facilitating attainment of the aforementioned desirable flow characteristics.

BRIEF SUMMARY OF THE INVENTION

According to one aspect of the invention there is provided a process in which a finely divided solids material is caused, at least over a transitory time period, to flow in a duct in counter-current flow to a liquid and in which the flows of liquid and solids material are maintained such as to each, over at least a substantial length of the duct, occupy substantially homogeneously the cross-section of the duct and such as to each be at a separate substantially constant flow speed at all points at any single cross-section in said length, said process including the step of facilitating said flow by use of a mechanical transporting device positioned within said duct, said device having a plurality of elements at spaced locations within the duct, said elements being of small maximum transverse cross-sectional size relative to the cross-sectional size of the duct, the elements being at least reciprocated so as to repetitively impart, to localized zones within said length adjacent the elements, transitory movement of the solids material in the direction of said flow of said solids material.

The invention also provides apparatus including a duct which, in use of the apparatus, a finely divided solids material is caused, at least over a transitory time period, to flow in counter-current flow to a liquid and in which the flows of liquid and solids material are maintained such as to each, over at least a substantial length of the duct, occupy substantially homogeneously the cross-section of the duct and such as to each be at a separate substantially constant flow speed at all points at any single cross-section in said length, the apparatus including a mechanical transporting device for facilitating said flow, said device comprising a plurality of elements within said duct, which elements are movably supported at spaced locations in the duct and of relatively small maximum transverse cross-sectional size compared with the transverse cross-sectional size of the duct and movement means being provided to at least reciprocate said elements whereby, in use of the apparatus, to repetitively impart to a plurality of localized zones of the solids material about said elements, and in said length, transitory movement in the direction of flow of said solids material in the duct.

In a more particular aspect, the invention provides a process for the reflux refining of metals in which impure metal crystals within a column of the liquid metal are transported from a cool zone through a temperature gradient to a hot zone, wherein melting of the crystals occurs; said transport being facilitated by the use of a mechanical device comprising a plurality of elements movably supported at spaced-apart locations within the column, each element being of small maximum transverse cross-sectional area relative to that of the column, said elements being moved at least reciprocally in the direction of extent of the column, whereby in consequence of the shape and movement of the elements there is, in the vicinity of each element, a nett displacement of crystals towards the hot zone. The slurry of crystals may be introduced into the cool zone of the column or may be generated within the cool zone.

The invention also provides apparatus for refining a metal by a method comprising forming a liquid column of the metal, said column having a relatively cool zone and a relatively hot zone and temperature gradient between said zones; the temperature of the cool zone being such as to permit co-existence of liquid and crystalline metal and said hot zone being at a temperature sufficient to melt the crystals; transporting crystals from the cool zone through the temperature gradient and into the hot zone; said apparatus comprising a duct for containing said column, heating means for establishing said hot zone, and a device for facilitating said transporting of said crystals, said device comprising a plurality of elements, which elements are supported at spaced locations within the duct and such as to be within said zone having a temperature gradient, in use of the apparatus, the elements being of relatively small maximum transverse cross-sectional size compared with the corss-sectional size of the duct, and movement means operable in use of the apparatus to at least reciprocate said elements in the direction of extent of said duct to repetitively impart to a plurality of localized zones of said crystals, adjacent said elements and within said zone having a temperature gradient, transitory movement in the direction of transport of said crystals.

BRIEF DESCRIPTION OF THE SEVERAL VIEWS OF THE ACCOMPANYING DRAWING

The invention is further described with reference to the accompanying drawings in which:

FIGS. 2, 3 and 4 are perspective views of modified forms of transporting device for use in the apparatus of FIG. 1;

FIG. 5 is a side view of part of an element of a transporting device as shown in FIGS. 1 to 4;

FIG. 6 is a perspective view of another form of transporting device for use in the invention;

FIG. 7 is a fragmentary side view of part of an element of an alternative form of transporting device for use in the apparatus of FIG. 1.

DETAILED DESCRIPTION

Figure 1:
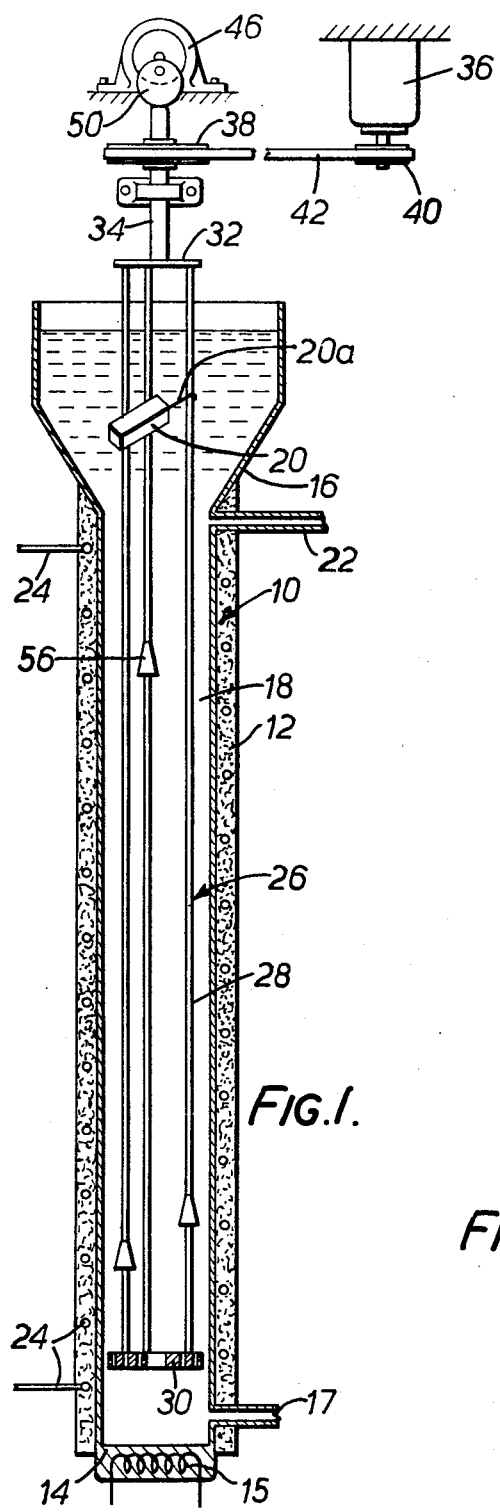
FIG. 1 is an axial cross-section of an apparatus for reflux refining of metals, and including a transporting device formed in accordance with the invention.

The apparatus shown in FIG. 1 is intended to carry out reflux refining of metal by a process described U.S. Pat. No. 4,043,803. It includes a vertical column 10 of circular transverse cross-section and covered with insulating material 12. The lower end 14 of the column is closed and a suitable heating means 15 is provided to heat this end. The upper end of the column is provided with an outwardly flared portion 16.

To use the apparatus, a slurry 18 is formed within column 10 this comprising a mixture of liquid metal to be refined and crystals of the metal to be refined. The liquid metal may be formed by heating liquid in the column by element 15 and the crystals are formed, in this instance, by adding at the upper end of the column cold solid ingots 20 of metal to be refined. These ingots are frozen in such a way as to promote microsegregation and, when inserted into the liquid column material, cause freezing with consequent microsegregation of the outer surface of a layer of solid material which is substantially partially remelted to release crystals into the column, the ingots themselves in turn being remelted to release further crystals. By appropriate regulation of the temperature gradient between the top and bottom of the column, it is possible to achieve a downward flow of crystals thus released into the column this being against an upward flow of liquid metal which is produced at the bottom of the column by heating element 15 the flow being such as to cause purification of metal at the bottom end. A proportion of such metal may be removed, for example continuously, via a lower column outlet 17. With purification of metal at the lower end, liquid metal at the upper end of the column just below portion 16 is enriched with the impurity metal and a proportion can be withdrawn, for example continuously, via an outlet 22. In order that the apparatus will function correctly, it is desirable that crystals advancing down the column be moved at a constant rate against the upward flow of liquid metal and that the flow be relatively homogeneous over the whole transverse area of the column, rather than the liquid forming upwardly flowing channels within the advancing crystal mass. Since the flow is to some extent affected by variations in temperature profile across the transverse cross-section, an electric winding 24 is wound around column 10 within insulating material 12 to allow a controlled amount of heat to be applied to the periphery of the column thereby minimising any transverse temperature gradient, and avoiding freezing of metal at the inner walls of the column.

In order to further facilitate flow, column 10 is provided with a transporting device 26. This consists of a mounting structure in the form of three parallel rods 28 extending within the column. These are secured, at lower ends, to a perforate or otherwise open plate 30 disposed somewhat above lower end 14 of the column 10. At upper ends, rods 28 are connected to a common connecting member 32 disposed above the top of the column. Connecting member 32 is in turn affixed to a vertically extending shaft 34. Mechanism is provided for rotating shaft 34 about its axis and for reciprocating it in the vertical direction. Thus, a motor 36 drives shaft 34 via pulleys 38, 40 affixed to shaft 34 and to the motor shaft and via a V-belt 42 interconnecting pulleys 38, 40. The reciprocating movement is effected by a motor 46 having an eccentrically mounted cam 50 thereon. The device 26 is biased upwardly, such as by natural buoyancy thereof in the column material, and/or by use of a spring (not shown) so that the upper end is maintained against the side surface of cam 50. Thus, when the cam turns, the shaft is reciprocated back and forth against the upward biasing thereof. Rods 28 provide a convenient anchorage for an ingot 20, which may be formed with a cast-in wire 20a for affixment to a rod 28 thereby ensuring that movement of the ingot can be achieved when device 26 is moved.

Rods 28 carry conical elements 56. These are positioned at different heights within the column and are arranged with apeces directed upwardly. When the apparatus is in use, the device 26 is set into motion such that it reciprocates and rotates and it has been found that this movement greatly improves the efficiency of the apparatus.

Experiments to determine the best form of transporting device 26, and the best form of its movement, have been conducted using apparatus like that shown in FIG. 1 and having two inch and five inch columns of various lengths. In these experiments the metal being refined was lead. In a two inch diameter column of length two feet transporting devices 26A, 26B shown in FIGS. 2 and 3 gave good results, that of FIG. 2 being somewhat superior. In device 26A, the rods 28A are four in number equi-spaced about locations close to the circumference of an annular lower plate 30A from which they extend. Three only of the rods 28A carry conical elements 56A one rod carrying one element one carrying two and one carrying three. Elements 56A are positioned at differing heights above plate 30A, the highest conical element 56A being positioned about a third of the way down the column.

The device 26B shown in FIG. 3 has three rods 28B affixed to transverse connecting rods at their lower ends each carrying three conical elements 56B these being spaced at dispositions corresponding to a greater length of column 10 than the dispositions of elements 56A in the device 26A.

The device 26C of FIG. 4 was found to be particularly effective in a five inch diameter column of height five feet. This device has six rods 28C having varying numbers of elements 56C positioned as shown in FIG. 4. Rods 28C are equi-spaced at locations close to the circumference of a lower perforate circular plate 30C from which these extend.

In general, it has been found expedient to position more conical elements towards the lower end of column 10 than towards the top end. The conical elements may be of the form of the element 56 shown in FIG. 5 having an apex angle $\alpha$ of approximately 20°. In a five inch diameter column the base dimension D may be $\frac{3}{4}''$ but smaller elements were used in the two inch diameter column experiments, these being of the order of only 1" long. In the experimental arrangements, the rods 28, 28A, 28B, 28C were formed from $\frac{3}{8}''$ diameter steel.

It was found expedient to rotate the transporting device at a rate giving movement of the outer parts thereof at a much slower velocity than the velocity of movement in the vertical direction. For example, a rate of rotation of about 0.5 rpm and a rate of vertical reciprocation of about 200 strokes per minute were found to be satisfactory. The extent of vertical movement may be of the order of $\frac{1}{4}''$.

Reciprocating motions in which the downward movement velocity is in excess of the upward movement velocity were found to be particularly effective. A cycle of movement comprising downward movement occupying approximately 0.05 seconds and an upward movement occupying 0.10 seconds was satisfactory. In general, the circulatory movement of the transporting device should be such as to reposition the elements thereon at locations such that over a relatively limited time period, the elements have been positioned to effect movement or localised compression of substantially every part of the slurry in a substantial length of the column. Such a time period may be of the order of 60 seconds.

In general, the movement of the transporting device should be such as to induce compaction and locking together of substantially the whole of the crystal mass contained in the slurry (or at least that part which is below the uppermost conical element) to cause consequent plug flow of such crystal mass during the downward stroke. During upward strokes, the velocity may be such as not to induce such compaction and locking together. Again, the frequency of axial oscillation will normally be chosen to be sufficient to transport the crystal mass downwardly at a rate to match the desired production rate of the column. The velocity of the circulatory motion will normally also be chosen to prevent adhesion of the crystal mass to the walls of the column.

In an alternative arrangement the elements may be arranged to reciprocate independently of each other, so that, for example, starting with those nearest the cool zone, elements are caused to move sequentially (in the direction of crystal transport) along the length of the column.

It is not essential that the transporting device be of the form described. For example, the conical elements may be replaced by elements like the element 56D shown in FIG. 7. This element is in the form of a bar 60 which is pivotally mounted at one end to rod 28D. It is movable between the position shown in solid lines, at which it extends generally normally outwardly from its pivot point on rod 28D and is prevented from further movement in the clockwise direction as viewed in the drawing by engagement with an abutment 62 on rod 28D to the position shown by the dotted lines 60' at which it extends generally downwardly from its pivot point at an acute angle and is prevented from further anticlockwise rotation by engagement with a second abutment 64 on rod 28D. The arrangement is such that during upward movement of rod 28D the element assumes the position shown in dotted lines, and during downward movement assumes the position shown in solid lines. Elements 56 may be other than conical in shape. Generally it may be stated that the preferred shape should be such that in motion in the column, an element will encounter substantially greater resistance when travelling in the direction of solids transport than in the reverse direction. This reduces undesirable carryback of solids on the reverse stroke, thus complementing advantages of moving the elements in the direction of solids transport at a relatively quicker rate than in the reverse direction. They may, for example, be pyramidal with apeces directed upwardly, or hemispherical or rectangular prismatic. It is preferred, however, that the elements be inwardly tapered in the upward direction whereby to provide zones of relatively greater compression below the elements as they move downwardly.

FIG. 6 illustrates a further modified transporting device 26E in which the elements 56 are replaced by elements 56E of disc-like form. The device 26E may be otherwise identical to any of the devices 26A, 26B or 26C.

Figure 8:
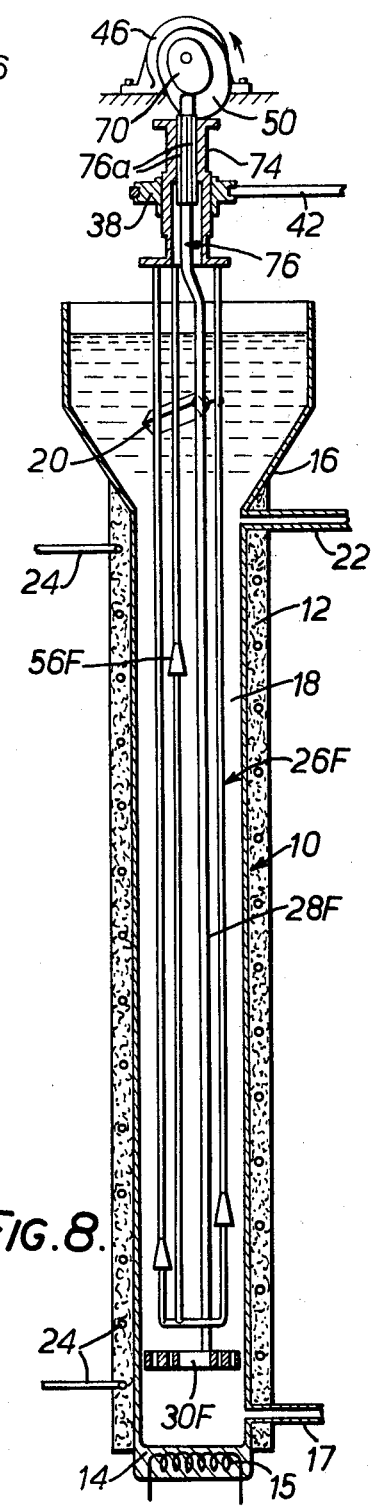
FIG. 8 is an axial cross-section of an alternative form of apparatus for reflux refining of metals in accordance with the invention.

The apparatus shown in FIG. 8 is generally similar to that of FIG. 1 and like reference numerals are employed to designate like parts. Particularly the transporting device 26F shown is similar to that shown in FIG. 1, but without the base plate 30. Device 26F includes upright rods 28F with cone shaped elements 56F at upper ends thereof.

The device 26F is driven via the motors 36, 46, eccentric cam 50 and pulleys 38, 40 and belt 42 as shown in FIG. 1, for rotational and reciprocating movement. Cam 50 engages the upper end of an upper shaft 74 of device 26F to which shaft pulley 38 is attached. Shaft 74 is hollow and an elongate coaxial shaft 76 extends through this and downwardly to support therefrom, at the lower end of the column 10, a transverse perforate plate 30F. An eccentric cam 70 attached to the drive shaft of motor 46 bears against the upper end of shaft 76 to effect reciprocation of the shaft and plate 30F. Shaft 76 has splines 76a which cooperate with splines on the interior of shaft 74 so that shafts 74, 76 are keyed together, and rotation of the base plate and of device 26F occurs simultaneously in operation of the device. However, the separate reciprocation mechanisms for the device 56F and plate 30F provided by separate cams 50, 70 ensure that, whilst the frequency of reciprocation is the same for plate and device, the amplitudes of movement may be made different as may be the relative phasing of movements between the device and base plate. Of course by appropriate selection of the profile of cam 70, the rate of reciprocation of plate 30F may also be made different to that of device 26F. This has been found to provide for additional flexibility in setting up the apparatus to give optimum operation. It has been observed in this connection that the provision of a perforate plate of some kind in the transporting device is associated with somewhat more efficient refining and it is believed, from this, that the function of the plate in assisting refining action may not be exactly the same as that of the remainder of the device. It has been found that movements of the plate 30F other than reciprocation in the lengthwise direction of the apparatus can achieve satisfactory results although the illustrated vertical reciprocatory movement is, of course, convenient in practice. The amplitude of oscillation is relatively critical and it has been found that amplitudes exceeding ½" are excessive and that preferably the vibration amplitude should be less than ¼". Advantageously, the described mode of movement of the transporting devices where the downstroke is of greater velocity than the upstroke is useful for the plate 30F. A reciprocation rate of about 100 cycles per minute may be satisfactory for the base plate on the apparatus in FIG. 8, with the device 26F reciprocating at 200 cycles per minute. The apertures in the base plate should be spaced over the area of the base plate. The total aperture area expressed as a fraction of the column cross-sectional area may be in the range 10 to 90%, but the selection of aperture size and distribution of apertures is conditional upon many factors and is best determined by experiment.

Devices of the invention, including separately moved perforate base plates, where provided, may be reciprocated at rates in the range 100 to 400 cycles per minute.

The described devices have also been described as being utilised in a particular form of apparatus, but it will be also appreciated that the devices could be used in other types of apparatus in which the aforementioned desirable flow characteristics are to be achieved. For example, such other types of apparatus include the aforementioned crystallisation apparatuses for use with organic substances as well as in leaching apparatuses. It is also usable in other forms of apparatus for purifying metals as described in our aforementioned co-pending patent application, particularly those in which generation of the necessary slurry is achieved in ways other than the described dissolving of ingots. In all such cases, the form of the column may be altered. It may be of other than circular shape, being for example polygonal in cross-section or of complex form consisting for example of several sidewardly interconnected columns with one or more transporting devices within each such column. The column may be replaced by a duct which is non-vertical and even where vertical columns are employed it is not essential that the lower end be the heated end.

The use of a transporting device as described has been found to provide greatly improved efficiency of purification of metals, together with greatly improved production rates. The following comparative results were achieved in the refining of lead containing 1700 parts per million silver in columns 2" and 5" in diameter and ranging in height from 7" to 5'. The purity of lead recovered at the base of the column was measured when the apparatus was modified to use (a) a transporting device in the form of a rotary stirrer of the kind described in Australian Pat. No. 416,845

(b) a transporting device in the form of a reciprocable inverted cup-shaped piston having mesh across its lower end; and (c) a transporting device as herein disclosed.

In case (a) a best purity of 850 parts per million silver was obtained and in case (b) a best purity of 34 parts per million was achieved, although this was only when a 7" length column was used, the apparatus not working at all with larger columns. In case (c) refinement down to 0.04 parts per million silver has been achieved and large quantities of lead containing less than 2 parts per million silver have consistently been obtained.

The following table shows comparative results for use of four forms of transporting device, these comprising:

1. Device as in FIG. 4;
2. Device like that of FIG. 4 but with conical elements replaced by discs of the same diameter;
3. Device like that of FIG. 4 but with no elements of any kind at the upper ends of the rods;
4. Device like that of FIG. 4 with discs instead of cone shaped elements but with no base plate.

The tests were conducted in a column 5 feet tall and 4¾ inches in diameter and involved the refining of lead when using cooled ingots to make the crystals. In each case the frequency of vibration of the device, the rate of rotation and the amplitude of vibration were kept constant as were the heat inputs at the side and top of the column. The heat input at the base was increased throughout the processing for identical time cycles in each test, whilst the production rate was maintained at the same constant level for each test.

TABLE

| Run No. | 4–18 | 4–19 | 4–20 | 4–21 |
|---|---|---|---|---|
| Form of apparatus | Cones and base plate as illustrated in FIG. 4 | Cones replaced by discs of the same diameter | No cones or discs on rods | Discs no base plate |
| Stroke, mm | 4.8 | 4.8 | 4.8 | 4.8 |
| Frequency cycles/min. | 240 | 240 | 240 | 240 |
| Rotational speed RPM | 1.0 | 1.0 | 1.0 | 1.0 |
| Purity of feed, ppm Ag | 2390 | 2390 | 2390 | 2390 |
| Purity of product ppm Ag | 0.04 to 0.06 at end of run | 1.5 to 2.3 at end of run | Minimum of 4.5 early in run, followed by an increase to 956 | Minimum of 1.6 early in run, followed by an increase to 5.8 at end of run. |

The above illustrates the efficiency of providing spaced apart elements such as the elements 56, 56A ... 56F, since in the arrangement without these only relatively inefficient refining resulted. The expediency of the preferred conical form for the elements is illustrated by the comparison between the first two tabulated examples in that the more efficient refining was achieved with the conical rather than disc shaped elements, although the disc shaped elements still gave quite good results. On the other hand, the absence of a base plate, with the absence of conical shaped elements, led to results which, although reasonable are not as good as compared with those obtained by use of the device of FIG. 4.

Similar results can be demonstrated in the use of the process and apparatus for refining other metals, for instance, tin, zinc and aluminium. In refining tin a reduction in lead content from 7,700 to 20 ppm has been achieved, and it has been found possible to reduce the lead content of a zinc charge from 800 ppm to less than 1 ppm. Impure aluminium containing iron and silicon amounting to a total of 0.3 percent. was refined to produce purified aluminium containing less than 0.0008 percent. of iron plus silicon.

EXAMPLE

A reflux refining unit was constructed, this consisting of a mild steel crystal-making tank 26 cm inside diameter mounted centrally over a 12.5 cm inside diameter mild steel column 1.5 m tall heated by an electrical coil external to the base of the column. The heat input from the coil was controllable using a Variac autotransformer. The sides of the column and the crystal making tank were insulated and also heated, so that only a small amount of heat entered through the column walls. Between production runs, the heat inputs were adjusted so that metal in the column was held just above its melting point.

Crystals were made in the crystal tank by the addition of cold ingots of feed material, or by the insertion of a cooled tube. The latter method of crystal making was adopted for the production run now described, using impure lead containing 1700 ppm AG. In operation, the cold tube was cooled internally by water addition to form crystals on its outside. The cooling was then discontinued and the subsequent reheating allowed (in one to three minutes) the crystals to slough off the crystallizer and to be broken down into separate crystals by agitation in the crystal tank and further agitation by the transport apparatus within the refining column.

The transport apparatus extended from 5 cm above the base of the column to 10 cm above the top of the column within the crystallization tank. The transport apparatus used for this run consisted a base plate of 11.5 cm dia having 5 holes (each 2 cm dia.). An assemblage of 5 rods ($\frac{3}{8}$" dia.) extended from the base plate to distances varying between 10 cm below to 10 cm above the top of the column. The rods were braced at the top by welding inverted V-shaped wedges between these. All rods had solid mild steel cones attached, each of them having a top angle of 30° and a base diameter of 3.2 cm. A total of 38 cones were used on the rods and these were spaced so that the preponderance of the cones were on the outer rods, and so that the minimum spacing between any two cones was less than 10 cm. The rods were spaced so that the swept area of the column was substantially complete, the span being from close to the column wall to about 1 cm from the centre of the column.

The transport apparatus was attached to a central driving shaft at a distance of 10 cm from the top of the column and in operation the shaft was simultaneously oscillated vertically and rotated.

The rate of rotation of the transporting apparatus was 2 R.P.M., the amplitude of vertical oscillation was 0.5 cm and the frequency of oscillation was 240 cycles per minute. The oscillation was imparted to the central driving shaft using a cam, and the shaft was caused to follow the cam by the use of strong springs. The profile of the cam was such as to cause the transport apparatus to be forced down more quickly than it was drawn up.

The production run was commenced by making crystals at the top of the column and transporting them to the base, this procedure being continued until the column and crystal tank were full of a slurry of crystals. (A procedure lasting about 60 minutes.) The heating at the base of the column was then increased by 1.2 KW (corresponding to a production rate of 1.2 tonne of refined lead per day) and the column was operated on total reflux (i.e, no product taken at the base) for a further two hours. Production was then commenced at the rate of 1.2 tonnes/day, whilst maintaining the lead level constant at the top of the column by the addition of liquid lead feed. The product levels taken at the top reached a maximum of 1.53% silver while the minimum silver level in the product lead from the base of the column was less than 0.04 to 0.06 ppm.

We claim:

1. A continuous process of the reflux refining of metals comprising transporting impure metal crystals, within a column of a slurry of said crystals close to equilibrium at all times with a more impure form of the liquid metal under conditions of substantially continuous counter current plug flow, from a cool zone through a continuous temperature gradient within the column to a hot zone, wherein melting of the crystals occurs to form a liquid, some of which is displaced toward the cool zone as a countercurrent reflux stream; said transport being facilitated by the use of a mechanical device comprising a plurality of elements movably supported at spaced-apart locations within the column, each element being of small maximum transverse cross-sectional area relative to that of the column, said elements being moved at least reciprocally in the direction of extent of the column, whereby in consequence of the shape and movement of the elements there is, in the vicinity of each element, a nett displacement of crytals towards the hot zone.

2. A process as claimed in claim 1, wherein said elements are so moved that, in addition to said reciprocation, successive repositioning of the elements is effected so that each said element effects said crystal displacement sequentially at a plurality of different cross-sectional locations in the column.

3. A process as claimed in claim 2, wherein said successive repositioning is effected by rotating said device.

4. A process according to claim 2, wherein reciprocation of the elements is such that movements in the direction of transport of said crystals are quicker than the return movements.

5. A process as claimed in claim 2, wherein not all said elements are at the same lengthwise position one relative to the other, and not all are at the same location when viewed parallel to the direction of extent of the column.

6. A process as claimed in claim 2, wherein reciprocation of the elements is such that movements of the elements directed in the direction of transport of said crystals are so executed as to effect compaction and locking together of substantially the whole of said crystals in that zone of the column having a temperature gradient, with consequent transport by plug flow of the crystals, whilst return movements are so executed as to avoid such compaction and locking together.

7. A process as claimed in claim 2, wherein said reciprocation has an amplitude not exceeding ½" and wherein said rotation is effected so that said elements are cyclically shifted through the column in a manner such that there is a nett transport of crystals towards the hot zone in substantially each part of the column having a temperature gradient, at least once every 60 seconds.

8. A process as claimed in claim 7, wherein said device includes a plurality of elongate supports extending from the said elements in the lengthwise direction of the column, said elongate supports being of lesser transverse cross-sectional area than the maximum transverse cross-sectional area of said elements.

9. A process as claimed in claim 2, wherein a transversely extending perforate plate is located adjacent the junction between said relatively hot zone and the zone of the column having a temperature gradient, said base plate being repetitively moved relative to said column.

10. A process as claimed in claim 9, wherein said base plate is reciprocated in the direction of extent of the column.

11. A process as claimed in claim 10, wherein said device includes a plurality of elongate supports extending from the said elements in the lengthwise direction of the column to said base plate, said elongate supports being of lesser transverse cross-sectional area than the maximum transverse cross-sectional area of said elements.

12. A process as claimed in claim 2, wherein said column is vertical with said hot zone lowermost.

13. A process as claimed in claim 2, wherein the metal is selected from the group consisting of lead, tin, zinc and aluminium.

14. A process as claimed in claim 13, wherein the metal is lead.

15. A process as claimed in claim 6, wherein said device is rotated at a speed in the range 0.5 to 2 rpm and said reciprocation is effected at a rate in the range 100 to 400 cycles per second.

16. A process as claimed in claim 2, wherein said elements are moved in unison.

17. A process according to claim 2, wherein said elements are moved independently of each other.

18. A process as claimed in claim 2, wherein said elements are so shaped that resistance to their movement in the direction of solids transport is greater than resistance to their movement in the reverse direction.

19. A process as claimed in claim 18, wherein said elements each have an exterior surface tapered in the direction of extent of the column and convergent against the direction of solids transport.

20. A process as claimed in claim 19, wherein said elements are pyrimidal or conical in shape with apices directed against the direction of solids transport.

21. A continuous process for the reflux refining of metals comprising transporting impure metal crystals within a column of a slurry of said crystals close to equilibrium at all times with a more impure form of the liquid metal under conditions of substantially continuous counter current plug flow, from a cool zone through a continuous temperature gradient within the column to a hot zone, wherein melting of the crystals occurs to form a liquid, some of which is displaced toward the cool zone as a countercurrent reflux stream; said transport being facilitated by the use of a mechanical device comprising a plurality of elements movably supported at spaced-apart locations within the column not all said elements being at the same lengthwise position one relative to the other, and not all being at the same location when viewed parallel to the direction of extent of the column each element being of small maximum transverse cross-sectional area relative to that of the column, said elements being moved at least reciprocally in the direction of extent of the column, whereby in consequence of the shape and movement of the elements there is, in the vicinity of each element, a nett displacement of crystals towards the hot zone, said elements being so moved that, in addition to said reciprocation, successive repositioning of the elements is effected so that each said element effects said crystal displacement sequentially at a plurality of different cross-sectional locations in the column; said successive repositioning being effected by rotating said device and reciprocation of the elements being such that movements in the direction of transport of said crystals are quicker than the return movements.

22. A continuous process for the reflux refining of metals comprising transporting impure metal crystals within a column of a slurry of said crystals close to equilibrium at all times with a more impure form of the liquid metal under conditions of substantially continuous counter current plug flow, from a cool zone through a continuous temperature gradient within the column to a hot zone, wherein melting of the crystals occurs to form a liquid, some of which is displaced toward the cool zone as a countercurrent reflux stream; said transport being facilitated by the use of a mechanical device comprising a plurality of elements movably supported at spaced-apart locations within the column, not all said elements being at the same lengthwise position one relative to the other, and not all being at the same location when viewed parallel to the direction of extent of the column each element being of small maximum transverse cross-sectional area relative to that of the column, said elements being moved at least reciprocally in the direction of extent of the column, whereby in consequence of the shape and movement of the elements there is, in the vicinity of each element, a nett displacement of crystals towards the hot zone, said elements being so moved that, in addition to said reciprocation, successive repositioning of the elements is effected so that each said element effects said crystals displacement sequentially at a plurality of different cross-sectional locations in the column; reciprocation of the elements being such that movements of the elements directed in the direction of transport of said crystals are so executed as to effect compaction and locking together of substantially the whole of said crystals in that zone of the column having a temperature gradient, with consequent transport by plug flow of the crystals, whilst return movements are so executed as to avoid such compaction and locking together.

* * * * *